(12) United States Patent
Wada et al.

(10) Patent No.: US 12,227,447 B2
(45) Date of Patent: Feb. 18, 2025

(54) COATING FILM-ATTACHED GLASS, PRODUCTION METHOD THEREFOR, AND MODIFIED GLASS SUBSTRATE

(71) Applicant: NIPRO CORPORATION, Osaka (JP)

(72) Inventors: Masamichi Wada, Osaka (JP); Atsushi Ishikawa, Osaka (JP)

(73) Assignee: NIPRO CORPORATION, Osaka (JP)

( * ) Notice: Subject to any disclaimer, the term of this patent is extended or adjusted under 35 U.S.C. 154(b) by 445 days.

(21) Appl. No.: 17/618,618

(22) PCT Filed: Jun. 12, 2020

(86) PCT No.: PCT/JP2020/023185
§ 371 (c)(1),
(2) Date: Dec. 13, 2021

(87) PCT Pub. No.: WO2020/251009
PCT Pub. Date: Dec. 17, 2020

(65) Prior Publication Data
US 2022/0250970 A1 Aug. 11, 2022

(30) Foreign Application Priority Data
Jun. 14, 2019 (JP) .................................. 2019-110916

(51) Int. Cl.
C03C 17/22 (2006.01)
C03C 3/06 (2006.01)
C03C 3/091 (2006.01)

(52) U.S. Cl.
CPC ................ *C03C 17/22* (2013.01); *C03C 3/06* (2013.01); *C03C 3/091* (2013.01);
(Continued)

(58) Field of Classification Search
CPC ........... C03C 17/22; C03C 3/06; C03C 3/091; C03C 2217/28; C03C 2218/153;
(Continued)

(56) References Cited

U.S. PATENT DOCUMENTS 6,928,224 B2    8/2005   Beall et al.
9,272,946 B2    3/2016   Chang et al.
(Continued)

FOREIGN PATENT DOCUMENTS

CN      106007385     * 10/2016
CN      106164329 A     11/2016
(Continued)

OTHER PUBLICATIONS

International Preliminary Report on Patentability dated Dec. 14, 2021 for PCT Patent Application No. PCT/JP2020/023185.
(Continued)

*Primary Examiner* — Tamra L. Dicus
(74) *Attorney, Agent, or Firm* — Ohlandt, Greeley and Perle, L.L.P.

(57) ABSTRACT

A coating film-attached glass comprising a glass substrate, and a coating film provided on at least a part of a surface of the glass substrate, in which a region from the surface of the glass substrate on the coating film side to a predetermined depth is a modified layer, and the modified layer has a microcrystalline structure at least in part.

12 Claims, 4 Drawing Sheets

(52) U.S. Cl.
 CPC .... *C03C 2217/28* (2013.01); *C03C 2218/153* (2013.01); *C03C 2218/31* (2013.01)

(58) Field of Classification Search
 CPC ..... C03C 2218/31; C03C 4/20; C03C 17/004; C03C 2218/32; C03C 2218/345; C03C 23/007; C03C 23/0025; C03C 17/245; C03C 17/32; C03C 23/00; C03C 17/3441; C03C 2217/213; C03C 2217/228; C03C 2217/29; A61J 1/065; A61J 1/1468; A61J 1/05
 See application file for complete search history.

(56) References Cited

U.S. PATENT DOCUMENTS

| | | | |
|---|---|---|---|
| 2009/0099000 A1 | 4/2009 | Kuwabara et al. | |
| 2009/0140628 A1* | 6/2009 | Kuepper | H01J 61/35 427/535 |
| 2014/0151370 A1* | 6/2014 | Chang | B32B 17/06 220/62.15 |
| 2014/0151371 A1 | 6/2014 | Chang et al. | |
| 2014/0323287 A1* | 10/2014 | Tratzky | C03C 3/093 501/67 |
| 2016/0016841 A1 | 1/2016 | Frost et al. | |
| 2017/0175252 A1 | 6/2017 | Koido | |
| 2018/0261439 A1 | 9/2018 | Myasnikov et al. | |
| 2019/0135685 A1* | 5/2019 | Shibata | A47G 19/22 |

FOREIGN PATENT DOCUMENTS

| | | | |
|---|---|---|---|
| DE | 102013207634 A1 * | 10/2014 | C03C 3/091 |
| DE | 102014214083 B4 | 3/2018 | |
| JP | 2002341172 A | 11/2002 | |
| JP | 2007076940 A | 3/2007 | |
| JP | 2016510288 | 4/2016 | |
| JP | 2019055896 A | 4/2019 | |
| WO | 2006123621 A1 | 11/2006 | |
| WO | 2016163426 A1 | 10/2016 | |

OTHER PUBLICATIONS

Japanese Office Action dated Mar. 28, 2023 for Japanese Appl. No. 2019-110916.
International Search Report dated Aug. 11, 2020 in corresponding International PCT Patent Application No. PCT/JP2020/023185, 2 pgs.
Second Chinese Office Action dated May 9, 2024 for Chinese Application No. 202080050074.X.
Russian Office Action with Search Report (with English translation) dated Jul. 21, 2022 for Russian Appl. No. 2022100432.
Indian Office Action dated Jun. 27, 2022 for Indian Appl. No. 202227002143.

* cited by examiner

COATING FILM-ATTACHED GLASS, PRODUCTION METHOD THEREFOR, AND MODIFIED GLASS SUBSTRATE

TECHNICAL FIELD

The present invention relates to coating film-attached glass, a production method therefor, and a modified glass substrate, and particularly relates to coating film-attached glass on which a chemically, thermodynamically, and physically stable coating film is formed, and a production method therefor. A glass substrate of the coating film-attached glass, for example, includes plate-shaped or tube-shaped glass, a glass vessel, a glass medical tool, and the like.

BACKGROUND ART

In a molding step of a glass vessel, a glass tube is processed into the shape of a vessel including a bottom portion and a mouth portion. In such a process, the glass tube is heated to be deformed into the bottom portion and the mouth portion. In a case where the glass tube is heated, an alkaline component or the like contained in glass is volatilized, and the volatilized alkaline component or the like is condensed and attached to the inner wall of the glass vessel while the glass vessel is cooled.

It is known that alkaline substances exuded or volatilized from the glass are formed into a large number of small droplets on the inner wall of the glass vessel and are condensed and fixed, and thus, a processing-degraded region is formed in the shape of a belt on the inner wall close to the bottom portion. In particular, in the glass vessel used for liquid storage, it is known that liquidity is basic due to an alkali or the like eluted from the processing-degraded region. This is serious particularly in a medical glass vessel because the stability of a medicinal agent to be contained may be impaired due to the basification.

In addition, it is also widely known that in the processing-degraded region, the glass is hydrolyzed by the contact of water molecules to be contained in the content, and thus, the glass itself becomes weak, the peeling (delamination) of a silica component in the glass occurs, and a glass-derived component (silicon, boron, sodium, potassium, and aluminum) is eluted to the content.

Therefore, an attempt for reducing the elution of an alkaline compound from a glass surface in contact with the content has been made from the related art. It is general that such an attempt is made by a treatment after molding the glass vessel, and for example, a sulfur treatment method is known in which sodium sulfate ($Na_2SO_4$) is generated by a reaction between the alkaline component existing on the inner wall of the glass vessel and a sulfate salt or the like, and the sodium sulfate is removed by being washed with water, or as a method of suppressing the elution of the alkaline component from the inner wall of the glass vessel, it is known that the inner wall of the glass vessel is subjected to a fire blast treatment with an oxygen-gas flame of a point burner while rotating the glass vessel formed from the glass tube to remove the processing-degraded region (for example, refer to Patent Literature 1). In addition, as a method of suppressing the hydrolyzability of the inner wall of the glass vessel, it is known that the inner wall is treated with $CO_2$ laser or the like while rotating the glass vessel formed from the glass tube to remove the processing-degraded region (for example, refer to Patent Literature 2 or Patent Literature 3).

On the other hand, a method of insulating the content from the glass surface by a coating film of an inorganic material such as silicon or an organic material on the glass surface, without reducing an absolute amount of the alkaline component, such as a method of forming a low-reactive coating film on the glass surface (for example, refer to Patent Literature 4) is also known. In such a method, it is possible to provide further added value to the glass vessel after the treatment by suitably selecting the composition of the coating film. For example, it is possible to reduce attachment properties of a polar content with respect to the inner wall by forming a hydrophobic coating film, and thus, it is possible to decrease remaining properties with respect to the vessel. This is an excellent advantage particularly when containing a rare and expensive medicinal agent such as a protein formulation, of which the demand has increased in recent years.

CITATION LIST

Patent Literature

Patent Literature 1: WO 2006/123621 A
Patent Literature 2: DE 10 2014 214 083 B4
Patent Literature 3: JP 2019-55896 A
Patent Literature 4: JP 2007-076940 A

SUMMARY OF INVENTION

Technical Problem

The methods in Patent Literatures 1 to 3 are effective in reducing the elution of the alkaline compound, but are required to provide added value such as the reduction of attachment properties of the content to the glass vessel after a processing treatment. Therefore, it is considered to apply a method of forming the coating film on the glass surface, as with Patent Literature 4. However, there are the following problems in the method of forming the coating film on the glass surface, as with Patent Literature 4. It is generally known that the usual glass surface is an inorganic phase, and thus, in many cases, adhesion properties with respect to the coating film that is an organic phase are low, and the coating film is difficult to form. In particular, it is difficult to form the coating film having low frictional properties or hydrophobicity on the glass surface.

Therefore, in order to form a stable coating film, in general, a method of forming the coating film after applying a primer having affinity with both of the glass layer and the coating film, such as a silane coupling agent, onto the glass surface is performed. However, not only do treatment man-hours increase but also heat stability of the silane coupling agent is low, and thus, such a method is not suitable for a medical vessel exposed to a high temperature condition such as dry-heat sterilization and steam sterilization.

In addition, even in a case where the coating film is formed on the glass surface, small holes (pinholes) are easily formed in the coating film when stability as the coating film is low. In a case where the pinholes are formed in the coating film, the coating film is gradually peeled off from the pinhole portions, and thus, not only is the coating film lost, but also foreign particles are mixed in the vessel content.

Therefore, an object of the present disclosure is to provide coating film-attached glass in which a contact angle with an aqueous content is large, transparency is high, lubricating properties (sliding properties) are excellent, the peeling (delamination) of a silica component in glass is less likely to occur, the elution of a glass-derived component (silicon, boron, sodium, potassium, and aluminum) with respect to the content is less likely occur, the aggregation (adsorption) of protein that is an active component of a medicinal product is less likely occur in a case where the coating film-attached glass is adjusted to a medical glass vessel, heat resistance is exhibited, and the peeling of a coating film is suppressed, a production method therefor, and a modified glass substrate.

Solution to Problem

The present inventors have conducted intensive studies in consideration of such problems, found that the problems are solved by modifying in advance the glass surface on the glass substrate, and completed the present invention. That is, coating film-attached glass according to the present invention includes a glass substrate, and a coating film provided on at least a part of a surface of the glass substrate, in which a region from the surface of the glass substrate on the coating film side to a predetermined depth is a modified layer, and the modified layer has a microcrystalline structure at least in part.

Coating film-attached glass according to the present invention includes a glass substrate, and a coating film provided on at least a part of a surface of the glass substrate, in which a region from the surface of the glass substrate on the coating film side to a predetermined depth is a modified layer, a content of $B_2O_3$ in the modified layer is less than that in a region deeper than the modified layer, by mass % in terms of an oxide, and a content of $Na_2O$ in the modified layer is less than that in the region deeper than the modified layer, by mass % in terms of an oxide, the modified layer contains at least 1 to 8 mass % of $B_2O_3$, 1 to 6 mass % of $Na_2O$, and 80 mass % or more of $SiO_2$, in terms of an oxide, and the region deeper than the modified layer contains at least 9 to 15 mass % of $B_2O_3$, 3 to 9 mass % of $Na_2O$, and 70 mass % or more of $SiO_2$, in terms of an oxide.

In the coating film-attached glass according to the present invention, it is preferable that the microcrystalline structure contains carbon. It is possible to further improve adhesiveness with respect to the coating film, in particular, a coating film containing a carbon element in a composition.

In the coating film-attached glass according to the present invention, it is preferable that the modified layer contains carbon. It is possible to further improve adhesiveness with respect to the coating film, in particular, a coating film containing a carbon element in a composition.

In the coating film-attached glass according to the present invention, it is preferable that the coating film is a silicon-free diamond-like carbon film, a silicon-containing diamond-like carbon film, a silicon oxide-based film, or an amorphous fluorine resin film. According to such a coating film, lubricating properties (sliding properties) are excellent, a contact angle with respect to an aqueous content is large, and the suppression of the aggregation (adsorption) of protein or the like that is an active component of a medicinal product is improved. In addition, a coating film more excellent in transparency can be obtained by a silicon oxide-based film.

The coating film-attached glass according to the present invention includes an aspect in which a film thickness of the coating film is 1 to 70 nm.

The coating film-attached glass according to the present invention includes an aspect in which the glass substrate is borosilicic acid glass having an expansion coefficient of $3.2\times10^{-6}$/K or more and $3.3\times10^{-6}$/K or less, or borosilicic acid glass having an expansion coefficient of $4.8\times10^{-6}$/K or more and $5.6\times10^{-6}$/K or less.

The coating film-attached glass according to the present invention includes an aspect in which the glass substrate is a vial container, a syringe barrel, a needle-tipped syringe, an ampule, or a cartridge type syringe (also simply referred to as a cartridge).

A production method for coating film-attached glass according to the present invention in which a coating film is formed on at least a part of a surface of a glass substrate includes a modification step of setting a region from the surface of the glass substrate on a side on which the coating film is provided to a predetermined depth as a modified layer, and a film formation step of forming the coating film on the surface of the glass substrate on which the modified layer is formed, in which the modification step includes at least any one step of (i) a step of blasting a flame generated by burning low hydrocarbon gas in the presence of oxygen gas from a burner to apply a portion rich in plasma in the flame to be blasted from the burner to the surface of the glass substrate on the side on which the coating film is provided, (ii) a step of performing a laser treatment with respect to the surface of the glass substrate on the side on which the coating film is provided, and (iii) a step of performing a high-temperature gas treatment with respect to the surface of the glass substrate on the side on which the coating film is provided.

In the production method for coating film-attached glass according to the present invention, it is preferable that the film formation step is a step of turning raw material gas containing at least hydrocarbon-based gas into plasma to form an amorphous coating film containing at least carbon as the coating film on the surface of the glass substrate on the side on which the coating film is provided. Lubricating properties (sliding properties) are excellent, a contact angle with respect to an aqueous content is large, and the suppression of the aggregation (adsorption) of protein or the like that is an active component of a medicinal product is improved, by the coating film containing a carbon element in a composition.

In the production method for coating film-attached glass according to the present invention, it is preferable that in the modification step, a temperature of a surface of the glass substrate on a side opposite to the surface on the side on which the coating film is provided is measured by a non-contact type thermometer, and the temperature to be measured is in a specific temperature range. It is possible to more reliably manage a temperature and to more reliably perform modification.

A modified glass substrate according to the present invention includes a modified layer on at least a part of a surface of a glass substrate, in which the modified layer is a region from the surface of the glass substrate to a predetermined depth and has a microcrystalline structure at least in part.

Advantageous Effects of Invention

According to the present disclosure, it is possible to provide coating film-attached glass in which a contact angle with an aqueous content is large, transparency is high, lubricating properties (sliding properties) are excellent, the peeling (delamination) of a silica component in glass is less likely to occur, the elution of a glass-derived component (silicon, boron, sodium, potassium, and aluminum) with respect to the content is less likely occur, the aggregation (adsorption) of protein that is an active component of a medicinal product is less likely occur in a case where the coating film-attached glass is adjusted to a medical glass vessel, heat resistance is exhibited, and the peeling of a coating film is suppressed, a production method therefor, and a modified glass substrate.

BRIEF DESCRIPTION OF DRAWINGS

FIG. 4(b) is an image in which FIG. 4(a) is partially enlarged.

DESCRIPTION OF EMBODIMENTS

Hereinafter, the present invention will be described in detail based on an embodiment, but the present invention is not interpreted as being limited to the description thereof. The embodiment may be modified in various forms as long as effects of the present invention are exhibited.

Figure 1:
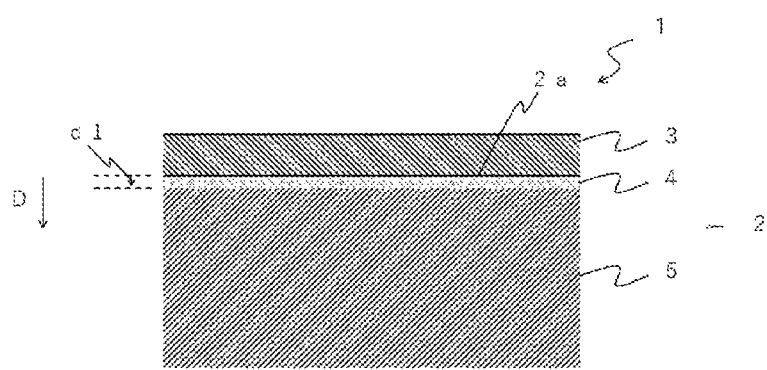
FIG. 1 is a schematic sectional view of coating film-attached glass according to this embodiment.
Figure 2:
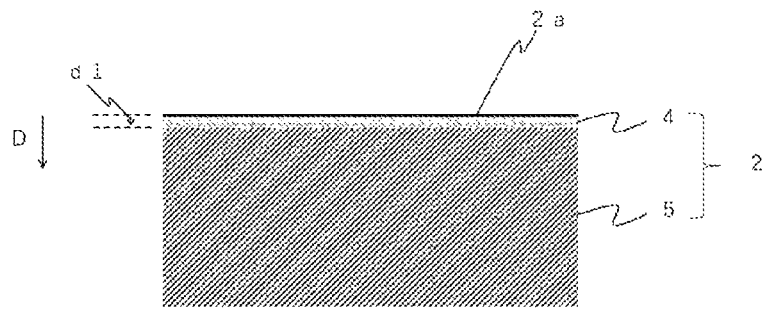
FIG. 2 is a schematic sectional view of a modified glass substrate according to this embodiment.

FIG. 1 is a schematic sectional view of coating film-attached glass according to this embodiment. Coating film-attached glass 1 according to this embodiment includes a glass substrate 2, a coating film 3 provided on at least a part of a surface 2a of the glass substrate 2, in which a region from the surface 2a of the glass substrate 2 on the coating film 3 side to a predetermined depth d1 is a modified layer 4, and the modified layer 4 has a microcrystalline structure at least in part.

In addition, the coating film-attached glass 1 according to this embodiment includes the glass substrate 2, and the coating film 3 provided on at least a part of the surface 2a of the glass substrate 2, in which the region from the surface 2a of the glass substrate 2 on the coating film 3 side to the predetermined depth d1 is the modified layer 4, the content of $B_2O_3$ in the modified layer 4 less than that in a region 5 deeper than the modified layer 4, by mass % in terms of an oxide, and the content of $Na_2O$ in the modified layer 4 is less than that in the region 5 deeper than the modified layer 4, by mass % in terms of an oxide, the modified layer 4 contains at least 1 to 8 mass % of $B_2O_3$, 1 to 6 mass % of $Na_2O$, and 80 mass % or more of $SiO_2$, in terms of an oxide, and the region 5 deeper than the modified layer 4 contains at least 9 to 15 mass % of $B_2O_3$, 3 to 9 mass % of $Na_2O$, and 70 mass % or more of $SiO_2$, in terms of an oxide. It is preferable to include a case in which the modified layer 4 has a microcrystalline structure at least in part.

(Glass Substrate)

In the coating film-attached glass 1 according to this embodiment, it is preferable that the glass substrate 2 is borosilicic acid glass having an expansion coefficient of $3.2 \times 10^{-6}$/K or more and $5.6 \times 10^{-6}$/K or less. The coating film-attached glass 1 according to this embodiment includes an aspect in which the glass substrate 2 is borosilicic acid glass having an expansion coefficient of $3.2 \times 10^{-6}$/K or more and $3.3 \times 10^{-6}$/K or less, or borosilicic acid glass having an expansion coefficient of $4.8 \times 10^{-6}$/K or more and $5.6 \times 10^{-6}$/K or less. Such a glass substrate 2 is preferable since the glass substrate 2 has a small expansion coefficient and low alkaline elution properties. Specifically, examples of the glass substrate 2 include NSV51 (manufactured by Nipro PharmaPackaging Americas Corp.), W33 (manufactured by Nipro PharmaPackaging Americas Corp.), BS (manufactured by Nippon Electric Glass Co., Ltd.), FIOLAX (Registered Trademark) (manufactured by Schott AG), DURAN (Registered Trademark) (manufactured by Schott AG), and the like. A catalog value of the composition (mass %) of each glass is shown in Table 1. In Table 1, in NSV51, the total content of $Na_2O$ and $K_2O$ is shown as the content of $Na_2O$ and $K_2O$. The same applies to W33 or DURAN. In addition, in Table 1, "–" indicates that the composition is not contained.

TABLE 1

| Product name | Expansion coefficient [$10^{-6}$/K] | Composition [mass %] | | | | | | | | |
|---|---|---|---|---|---|---|---|---|---|---|
| | | $SiO_2$ | $B_2O_3$ | $Al_2O_3$ | $Na_2O$ | $K_2O$ | CaO | MgO | BaC | Minors |
| NSV51 | 5.1 | 74.5 | 11.3 | 5.8 | 8.0 | | 0.4 | <0.1 | | 0.3 |
| B3 | 5.3 | 72.0 | 11.0 | 7.0 | 6.0 | 2.0 | 1.0 | — | 1 | — |
| FIOLAX (Registered Trademark) | 4.9 | 75.0 | 10.5 | 5.0 | 7.0 | — | 1.5 | — | | |
| W33 | 3.2 | 80.0 | 13.7 | 2.2 | 4.1 | | <0.05 | <0.05 | | |
| DURAN (Registered Trademark) | 3.3 | 81.0 | 13.0 | 2.0 | 4.0 | | — | — | — | — |

It is preferable that the glass substrate 2 is borosilicic acid glass having an expansion coefficient of $3.2 \times 10^{-6}$/K or more and $3.3 \times 10^{-6}$/K or less, and the surface 2a of the glass substrate 2, which is the interface with the coating film 3, contains at least 1 to 6 mass % of $B_2O_3$, 1 to 6 mass % of $Na_2O$, 1 to 2 mass % of $Al_2O_3$, and 80 mass % or more of $SiO_2$.

In addition, it is preferable that the glass substrate 2 is borosilicic acid glass having an expansion coefficient of $4.8 \times 10^{-6}$/K or more and $5.5 \times 10^{-6}$/K or less, and the surface 2a of the glass substrate 2, which is the interface with the coating film 3, contains at least 1 to 6 mass % of $B_2O_3$, 1 to 6 mass % of $Na_2O$, 5 to 6.5 mass % of $Al_2O_3$, and 80 mass % or more of $SiO_2$.

It is preferable that the glass substrate 2 has a transparent color or an amber color, and has light transmittance, and specifically, a light transmissivity at a wavelength of 590 to 610 nm or 290 to 450 nm is preferably 45% or more, and is more preferably 60% or more. An evaluation method for a transparency test is based on "Japanese Pharmacopoeia (17th Edition) 7. Tests for Containers and Packing Materials 7.01 Test for Glass Containers for Injections (5) Light transmission test for light-resistant containers".

The glass substrate 2, for example, includes plate-shaped or tube-shaped glass, a glass vessel, a glass medical tool, and the like. The coating film-attached glass 1 according to this embodiment includes an aspect in which the glass substrate 2 is a vial container, a syringe barrel (a syringe), a needle-tipped syringe, an ampule, or a cartridge type syringe (also simply referred to as a cartridge).

When the glass substrate 2 is the tube-shaped glass, the glass vessel, or the glass medical tool, it is preferable that at least a part of the surface 2a of the glass substrate 2 (the surface of the glass substrate 2 on the coating film 3 side), which is a surface on which the coating film 3 is formed, is the inner wall of the tube-shaped glass, the inner wall of the glass vessel, or the inner surface of the glass medical tool. Accordingly, it is possible to reduce attachment properties of a polar content with respect to the inner wall, and thus, it is possible to decrease remaining properties with respect to the vessel.

(Vial)

A vial is a vessel having an approximately cylindrical outer shape of which the bottom is sealed, and includes a bottom portion, a lateral surface portion, a neck portion, a mouth portion, an inner wall, and an outer wall. The vial has an internal space and is opened to one end of the mouth portion. The bottom portion is in the shape of a flat disk and is consecutive to the lateral surface portion on the edge of the bottom portion. The lateral surface portion is in a cylindrical shape. The lateral surface portion is molded such that an outer diameter and an inner diameter are constant in an axis direction. The neck portion is consecutive to the lateral surface portion and is in a tapered shape from the lateral surface portion. The neck portion is molded such that an inner diameter and an outer diameter are narrower than that of the lateral surface portion. The mouth portion is consecutive to the neck portion and includes an opening partitioned by the edge portion. The mouth portion is molded such that an inner diameter and an outer diameter are narrower than that of the lateral surface portion. The mouth portion is molded such that the outer diameter is wider than the narrowest portion of the outer diameter of the neck portion. The inner wall is a glass surface of the bottom portion, the lateral surface portion, the neck portion, and the mouth portion on the internal space side, and the outer wall is an outer surface facing the glass surface on the internal space side.

(Production Method for Vial)

As an example, the vial is molded by heating a glass tube that is vertically retained and rotated, using a general vertical molding machine. The glass tube is softened by being heated with a flame of a burner. A part of the glass tube is softened and deformed, and thus, the bottom portion and the mouth portion of the vial are molded from the glass tube. When the bottom portion is molded, an alkaline borate salt or the like is volatilized from borosilicic acid glass that is a raw material of the glass tube. An alkaline component such as the volatilized alkaline borate salt is attached to the vicinity of the bottom portion on the inner wall of the vial and causes a processing-degraded region.

(Modified Glass Substrate)

The modified glass substrate 2 according to this embodiment includes the modified layer 4 on at least a part of the surface of the glass substrate 2, and the modified layer 4 is the region from the surface 2a of the glass substrate 2 to the predetermined depth d1 and has a microcrystalline structure at least in part.

(Modified Layer)

The glass substrate 2 includes the modified layer 4, and the region 5 deeper than the modified layer 4. The modified layer 4 is a region from the outermost surface to the predetermined depth d1, in addition to the outermost surface of the glass substrate 2 (in FIG. 1, the surface 2a on the coating film side). The predetermined depth d1 from the outermost surface is preferably a depth of 100 nm from the surface 2a of the glass substrate 2 in a depth direction D, is more preferably a depth of 50 nm from the surface 2a of the glass substrate 2 in the depth direction D, is even more preferably a depth of 20 nm from the surface 2a of the glass substrate 2 in the depth direction D, and is still even more preferably a depth of 10 nm from the surface 2a of the glass substrate 2 in the depth direction D. Here, the depth direction D is a direction from the surface 2a of the glass substrate 2 on the coating film side toward a surface (not illustrated) on a side opposite to the coating film side. For example, in a case where the glass substrate 2 is the vial container, the depth direction D is a direction from an inner wall surface toward an outer wall surface. It is preferable that the modified layer 4 contains at least 1 to 8 mass % of $B_2O_3$, 1 to 6 mass % of $Na_2O$, and 80 mass % or more of $SiO_2$, in terms of an oxide. It is more preferable that the modified layer 4 contains at least, 2 to 6 mass % of $B_2O_3$, 2 to 4 mass % of $Na_2O$, and 90 mass % or more of $SiO_2$, in terms of an oxide. The composition of the modified layer 4, for example, is mass % in terms of each atomic oxide of a surface composition (an atomic composition percentage) to be analyzed by an X-ray photoelectron spectroscopy (XPS).

In the coating film-attached glass 1 according to this embodiment, it is preferable that the modified layer 4 contains carbon. It is possible to further improve adhesiveness with respect to the coating film 3, in particular, a coating film containing a carbon element in a composition. The content of carbon in the modified layer 4 is preferably 1 to 15 atomic %, is more preferably 1 to 11 atomics, is even more preferably 2 to 10 atomic %, is still even more preferably 3 to 8 atomic %, and is particularly preferably 4 to 8 atomics.

(Microcrystalline Structure)

For the microcrystalline structure, for example, the sectional surface of the glass substrate is observed by a transmission electron microscope (TEM). The microcrystalline structure is a sub-nanometer-sized array structure having an equal interval.

A portion having a microcrystalline structure is a portion in which crystalline particles having a particle diameter smaller than that in a surrounding portion of the portion are arrayed. In the microcrystalline structure, it is assumed that at least a glass component is crystallized, and specifically, it is assumed that $NaBCO_3$, $KBCO_3$, $(Na,K)AlBCO_3$, $(Na,K)CO_3$, $Na_2CO_3$, $Na_2O$, and the like, which contain Na as a main component and contain K, C, B, and the like as a component, are crystallized. An average particle diameter of the crystalline particles in the microcrystalline structure is preferably 1 to 10 nm, and is more preferably 1 to 5 nm. The average particle diameter is obtained by the observation of TEM, and may be obtained by X-ray diffraction (XRD) or small angle X-ray scattering (SAXS).

In the coating film-attached glass 1 according to this embodiment, it is preferable that the microcrystalline structure contain carbon. It is possible to further improve adhesiveness with respect to the coating film, in particular, a coating film containing a carbon element in a composition.
(Region 5 Deeper than Modified Layer 4)

The region 5 deeper than the modified layer 4 is a region that is consecutive to the modified layer 4 in the depth direction D. The region 5 deeper than the modified layer 4 may include the surface (not illustrated) of the glass substrate 2 on a side opposite to the coating film 3 side. There may be no boundary between the modified layer 4 and the region 5 deeper than the modified layer 4, and for example, a glass composition may be a gradient composition between the modified layer 4 and the region 5 deeper than the modified layer 4.
(Coating Film)

The coating film 3 includes an aspect in which the coating film 3 contains a carbon element in a composition. As an example, the coating film 3 is a silicon-free diamond-like carbon film. Here, the diamond-like carbon film is also referred to as a diamond-like carbon film, a DLC film, and an amorphous carbon film, and is a hydrogenated amorphous carbon film containing at least a carbon atom and a hydrogen atom.

A film thickness of the coating film is preferably 1 to 70 nm, and is more preferably 2 to 60 nm. In a case where the film thickness is less than 1 nm, it may be difficult to form a coating film homogeneously without any defect, and in a case where the film thickness is greater than 70 nm, peeling may occur, or coloring may exceed an allowable range.

Here, the coating film that is the silicon-free diamond-like carbon film includes an aspect in which the coating film is a silicon-free and fluorine-containing diamond-like carbon film (hereinafter, may be referred to as a "F-DLC film"), or a silicon-free and fluorine-free diamond-like carbon film (hereinafter, may be simply referred to as a "DLC film"). Note that, the fluorine-containing diamond-like carbon film is also referred to as a fluorinated amorphous carbon film.

As an example, the coating film 3 may be a silicon-containing diamond-like carbon film.

As an example, the coating film 3 may be a silicon oxide-based film containing organic silane or siloxane as a raw material. The organic silane and the siloxane are not particularly limited, and include hexamethyl disiloxane, hexamethyl silazane, tetraethoxysilane, tetramethoxysilane, and tetramethyl silane.

As an example, the coating film 3 may be an amorphous fluorine resin film. The fluorine resin is not particularly limited, and includes polytetrafluoroethylene and perfluoroalkoxyalkane. It is more preferable that the fluorine resin is an amorphous fluorine resin having transparency in a wide wavelength range of an ultraviolet ray, a visible ray, and a near-infrared ray. Specifically, the amorphous fluorine resin is CYTOP (Registered Trademark) obtained by cyclopolymerizing perfluoro(4-vinyl oxy-1-butene).

By providing the coating film 3 exemplified above, lubricating properties (sliding properties) are excellent, a contact angle with respect to an aqueous content is large, and the suppression of the aggregation (adsorption) of protein or the like that is an active component of a medicinal product is improved.
(Production Method for Coating Film-Attached Glass)

As illustrated in FIG. 1, a production method for the coating film-attached glass 1 according to this embodiment in which the coating film 3 is formed on at least a part of the surface 2a of the glass substrate 2 includes a modification step of setting the region from the surface 2a of the glass substrate 2 on a side on which the coating film 3 is provided to the predetermined depth d1 as the modified layer 4, and a film formation step of forming the coating film 3 on the surface 2a of the glass substrate 2 on which the modified layer 4 is formed, in which the modification step includes at least any one step of (i) a step of blasting a flame generated by burning low hydrocarbon gas in the presence of oxygen gas from a burner to apply a portion rich in plasma in the flame to be blasted from the burner to the surface 2a of the glass substrate 2 on the side on which the coating film 3 is provided, (ii) a step of performing a laser treatment with respect to the surface 2a of the glass substrate 2 on the side on which the coating film 3 is provided, and (iii) a step of a high-temperature gas treatment with respect to the surface 2a of the glass substrate 2 on the side on which the coating film 3 is provided.
(Modification Step)

A surface treatment in the modification step includes a plasma treatment or a heating treatment. Further, the plasma treatment includes (i) a treatment of blasting the flame generated by burning the low hydrocarbon gas in the presence of oxygen gas from the burner to apply the portion rich in plasma in the flame to be blasted from the burner to the surface 2a of the glass substrate 2 on the side on which the coating film 3 is provided (hereinafter, may be referred to as a modification step of (i)). The heating treatment includes (ii) a laser treatment to be performed with respect to the surface 2a of the glass substrate 2 on the side on which the coating film 3 is provided (hereinafter, may be referred to as a modification step of (ii).) and (iii) a high-temperature gas treatment to be performed with respect to the surface 2a of the glass substrate 2 on the side on which the coating film 3 is provided (hereinafter, may be referred to as a modification step of (iii)).

As an example, the modification step of (i) is a step of blasting the flame generated by burning the low hydrocarbon gas in the presence of oxygen gas from the burner to apply the flame to the glass surface of the glass substrate 2. The low hydrocarbon gas, for example, town gas, propane, butane, and natural gas. In addition, it is preferable that the portion rich in plasma in the flame, which is applied to the surface 2a of the glass substrate 2, is combustion flame rich in hydronium ions, which is generated as a result of burning.

In a case where the glass substrate 2 is the vial of the glass vessel, it is preferable that in the modification step of (i), the flame is applied to the inner wall of the vial, preferably, the flame is applied to the vicinity of the bottom portion of the inner wall of the vial (a portion including a processing-degraded region).

In the production method for the coating film-attached glass 1 according to this embodiment, it is preferable that in the modification step, the temperature of the surface of the glass substrate 2 on a side opposite to the surface 2a on the side on which the coating film 3 is provided is measured by a non-contact type thermometer, and the temperature to be measured is in a specific temperature range. It is possible to more reliably manage a temperature and to more reliably perform modification. It is preferable that the non-contact type thermometer is a thermography type thermometer. In addition, in a case where the glass substrate 2 is the vial container, the surface on the side opposite to the surface 2a is the outer surface of the vial container, and for example, the specific temperature range is preferably a range of 650° C. to 800° C., and is more preferably a range of 670 to 780° C.

Further, as an example, in the laser treatment in the modification step of (ii), laser light of a $CO_2$ (carbon dioxide) laser, an yttrium aluminium gernet (YAG) laser, or an ultra fast (UF) laser is applied to the glass surface of the glass substrate 2.

Further, as an example, in the high-temperature gas treatment in the modification step of (iii), overheated steam of an overheated steam generator is applied to the surface of the glass substrate 2.

In this embodiment, in the modification step, only one of the modification step of (i), the modification step of (ii), and the modification step of (iii) may be performed, or two or more thereof may be performed. A combination of two or more modification steps, for example, is a combination of (i) and (ii), a combination of (i) and (iii), a combination of (ii) and (iii), or a combination of (i), (ii), and (iii).

(Film Formation Step)

In the production method for the coating film-attached glass 1 according to this embodiment, it is preferable that the film formation step is a step of turning raw material gas containing at least hydrocarbon-based gas into plasma to form an amorphous coating film containing at least carbon as the coating film 3 on the surface 2a of the glass substrate 2 on the side on which the coating film 3 is provided. By the coating film 3 containing the carbon element in the composition, the lubricating properties (sliding properties) are excellent, the contact angle with respect to the aqueous content is large, and the suppression of the aggregation (adsorption) of protein or the like that is the active component of the medicinal product is improved.

In the film formation step, for example, it is preferable to form the amorphous coating film containing carbon by using a high-frequency film formation apparatus. The amorphous coating film containing carbon, for example, is the silicon-free diamond-like carbon film or the silicon-containing diamond-like carbon film, described above. When the coating film 3 is the silicon-free diamond-like carbon film, the raw material gas, for example, is acetylene, methane, ethylene, propane, benzene, hexafluoroethane, $C_6F_{10}(CF_3)_2$, $C_6F_5$, tetrafluoromethane ($CF_4$), and octafluoropropane ($C_3F_8$). In addition, when the coating film 3 is the silicon-containing diamond-like carbon film, the raw material gas, for example, is organic silicon gas such as trimethyl silane ($C_3H_{10}Si$) or tetramethyl silane ($C_4H_{12}Si$). The raw material gas may be used alone, or two or more types thereof may be used together.

Figure 3:
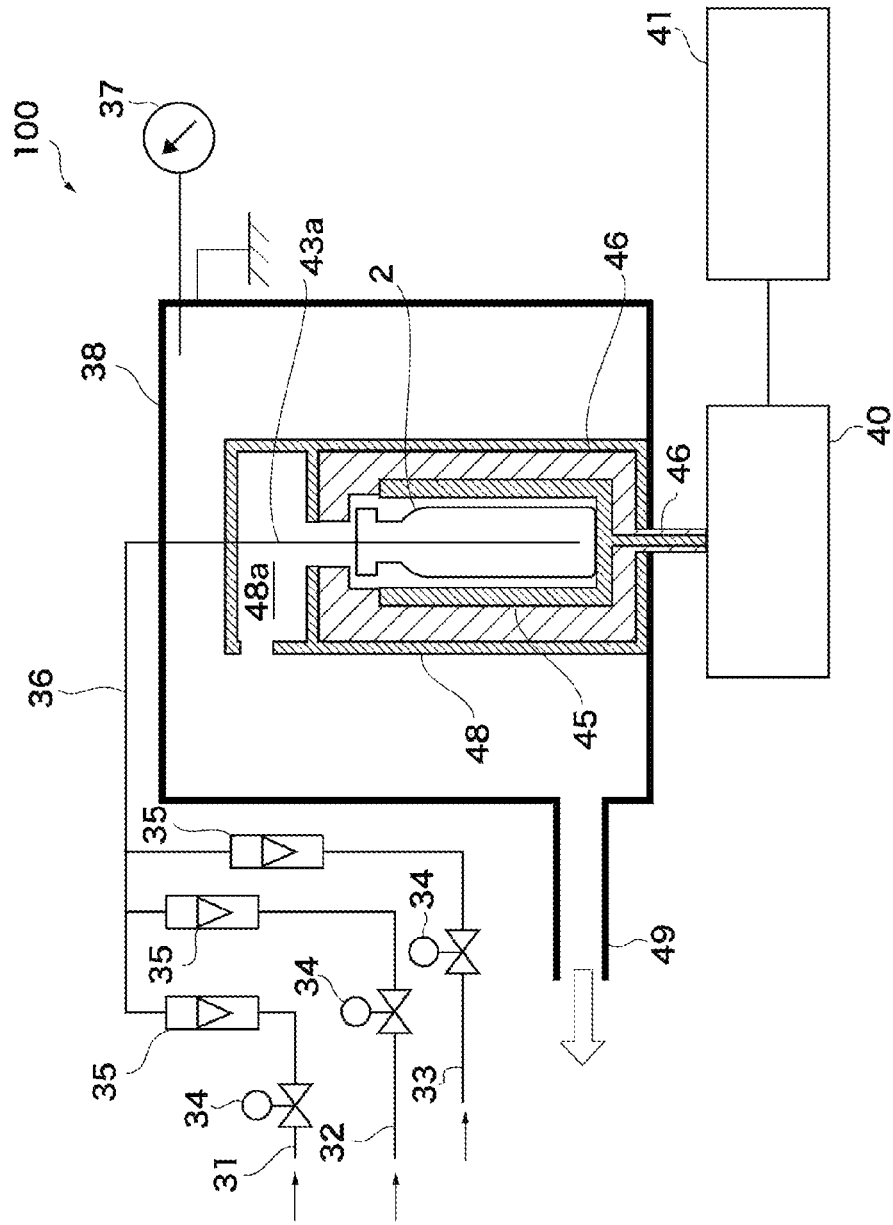
FIG. 3 is a schematic view of a high-frequency inner surface film formation apparatus for a vial container.

Next, an example of the film formation apparatus that can be used in the film formation step in the example in which the glass substrate 2 is the vial container will be described. FIG. 3 illustrates a schematic view of a high-frequency inner surface film formation apparatus for a vial container. A high-frequency inner surface film formation apparatus 100 for a vial container, illustrated in FIG. 3, includes raw material gas input systems 31, 32, and 33. Each of the raw material gas input systems includes a stop valve 34 and a gas flow meter 35, and is connected to one pipe 36 for mixed gas. In FIG. 3, an aspect is illustrated in which there are three raw material gas input systems, and more raw material gas input systems may be provided. The pipe 36 is connected to an internal electrode that is arranged in a vacuum chamber 38 and a conductive pipe 43a that also functions as a gas introduction pipe. The vacuum chamber 38 is grounded, and a vacuum gauge 37 is connected to the vacuum chamber 38. In addition, in the vacuum chamber 38, the vial container (glass substrate) 2, an external electrode 45 arranged to surround the lateral surface and the bottom surface of the vial container 2, a dielectric member 46 arranged to surround the external electrode 45, and an external case 48 that surrounds the dielectric member 46 and contains a conductive material for stably turning the raw material gas into plasma are arranged. The vacuum chamber 38 is connected to the exhaust pipe 49. In addition, the external electrode 45 is connected to an automatic matching device 40 not to be electrically continuous with the vacuum chamber 38. The automatic matching device 40 is connected to a high-frequency power source 41. A high frequency, for example, is 1 to 100 MHz, and is preferably 13.56 MHz. The raw material gas blown off from the conductive pipe 43a flows into the vial container 2, and then, is discharged from the tip port of the vial container 2, passes through a space 48a provided on the upper side in the external case 48, and then, reaches the internal space of the vacuum chamber 38. After that, is exhausted from the exhaust pipe 49.

EXAMPLES

Hereinafter, the present invention will be described in more detail, on the basis of Examples, but the present invention is not limited to such Examples.

(Preparation of Vial)

A bottom portion was molded from a borosilicic acid glass tube BS having an outer diameter of 15 mm and a wall thickness of 1.5 mm manufactured by Nippon Electric Glass Co., Ltd.) by a vertical molding machine, and thus, vials X1 and Y1 having an outer diameter of 15 mm, a height of 33 mm, a port inner diameter of 7.0 mm, and a content of 2.0 mL were prepared.

A bottom portion was molded from a borosilicic acid glass tube W33 having an outer diameter 15 mm and a wall thickness of 1.5 mm (manufactured by Nipro PharmaPackaging Americas Corp.) by a vertical molding machine, and thus, vials X2 and Y2 having an outer diameter of 15 mm, a height of 33 mm, a port inner diameter of 7.0 mm, and a content of 2.0 mL were prepared.

(Modification Step)

The plasma treatment using the modification step of (i) was performed with respect to the inner wall of the prepared vials X1 and X2.

(Condition of Modification Step of (i))

The treatment was performed by blasting a flame of a point burner into the internal space of the vial while retaining and rotating the vials X1 and X2, and by scanning the inner wall of the vial with the flame while applying a portion rich in plasma in the flame to the inner wall of the vial. In such a treatment, the point burner having a port inner diameter of 1.4 mm was used in which a mixed gas flame (a length of approximately 10 cm) containing town gas (methane) and oxygen at a complete combustion ratio was blown off.

(Composition Analysis of Glass Surface)

The composition of the glass surface (in the vicinity of 3 to 5 mm from the bottom portion) of the inner wall of the vial before and after the plasma treatment was analyzed by XPS (AXIS-NOVA, manufactured by Kratos Analytical Ltd.) Analysis results of the compound composition on the vial surface before and after the plasma treatment are shown in Table 2.

TABLE 2

| Sample | | Composition ratio (mass %) | | | | | | |
|---|---|---|---|---|---|---|---|---|
| | | $SiO_2$ | $B_2O_3$ | $Al_2O_3$ | $Na_2O$ | $K_2O$ | $CaO$ | $MgO$ |
| Example 1 (B3) | Vial X1 | 82.0 | 4.9 | 6.0 | 5.3 | 1.8 | 0.0 | 0.0 |
| Example 2 (W33) | Vial X2 | 91.0 | 5.1 | 1.6 | 2.3 | 0.0 | 0.0 | 0.0 |

TABLE 2-continued

| Sample | | SiO$_2$ | B$_2$O$_3$ | Al$_2$O$_3$ | Na$_2$O | K$_2$O | CaO | MgO |
|---|---|---|---|---|---|---|---|---|
| Comparative Example 1 (B3) | Vial Y1 | 59.3 | 20.4 | 5.6 | 12.3 | 1.4 | 1.0 | 0.0 |
| Comparative Example 2 (W33) | Vial Y2 | 58.7 | 23.5 | 1.7 | 16.1 | 0.0 | 0.0 | 0.0 |

Composition ratio (mass %)

(Film Formation Step)

A condition at the time of forming a film on the inner surface of the vial (X1, X2, Y1, and Y2) is as follows.
Device: a low-pressure plasma CVD device, illustrated in FIG. 3
High-Frequency Output: 100 W, 13.56 MHz
Initial Depressurization: 0.02 torr
Film Formation Pressure: 2 torr
Film Formation Time: as shown in Table 3
Mixed Gas: as shown in Table 3 Here, a ratio indicates a volumetric flow mixing ratio.
Pretreatment: none

TABLE 3

| Sample | Outermost layer | Pre-treatment | Gas | Film formation time [sec.] |
|---|---|---|---|---|
| Example 1 (BS) | F-DLC | None | C$_2$H$_2$—C$_2$F$_6$ (2:8) | 20 |
| Example 2 (W33) | F-DLC | None | C$_2$H$_2$—C$_2$F$_6$ (2:8) | 20 |
| Comparative Example 1 (BS) | F-DLC | None | C$_2$H$_2$—C$_2$F$_6$ (2:8) | 20 |
| Comparative Example 2 (W33) | F-DLC | None | C$_2$H$_2$—C$_2$F$_6$ (2:8) | 20 |

In table, F-DLC indicates "silicon-free and fluorine-containing diamond-like carbon film".

[Steam Sterilization Treatment]

Each of the vials was filled with water of 90% of the full content and was subjected to a high-pressure steam sterilization treatment at 121° C. for 1 h. In Examples 1 and 2, it was not possible to check the peeling of F-DLC of the outermost layer, but in Comparative Examples 1 and 2, the peeling of F-DLC of the outermost layer was checked.

[Microcrystalline Structure]

Figure 4A:
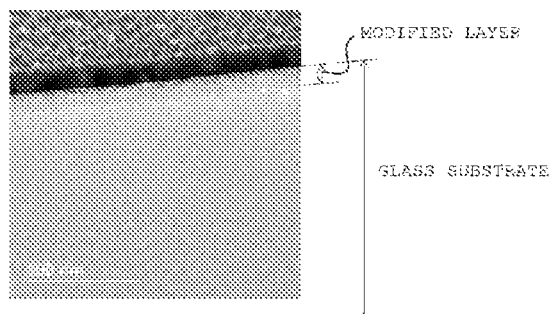
FIG. 4(a) is a TEM image of a sectional surface of a modified glass substrate after a modification step and before a film formation step in Example 1.
Figure 4B:
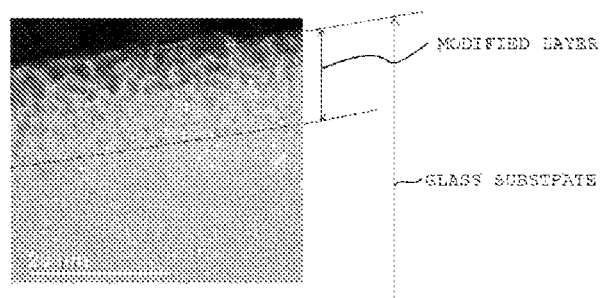

FIG. 4(a) is a TEM image of the sectional surface of a modified glass substrate after the modification step and before the film formation step in Example 1, and FIG. 4(b) is an image in which FIG. 4(a) is partially enlarged. In FIG. 4(a) and FIG. 4(b), a portion on the modified layer is a protective film that is provided for TEM analysis. As illustrated in FIG. 4(a) and FIG. 4(b), it was possible to check that the modified layer has a microcrystalline structure at least in part. In FIG. 4(b), a dotted line was applied to a part that is regarded as the boundary between the modified layer and a region deeper than the modified layer.

Figure 5:
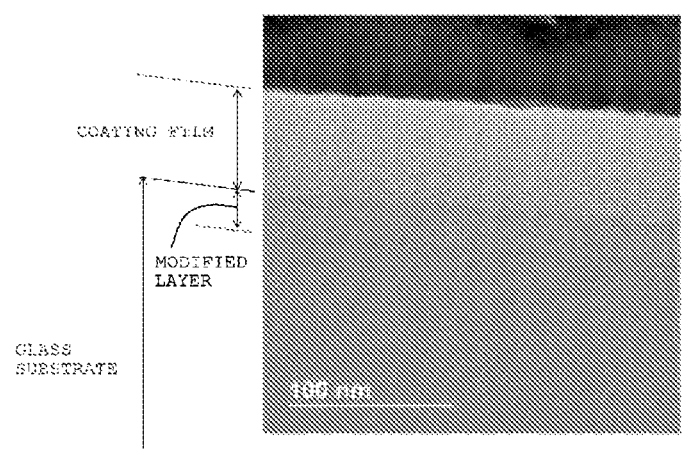
FIG. 5 is a TEM image of a sectional surface of coating film-attached glass after the film formation step in Example 1.

FIG. 5 is a TEM image of the sectional surface of coating film-attached glass after the film formation step in Example 1. As illustrated in FIG. 5, it was possible to check that the coating film-attached glass includes the modified layer in the region from the surface of the glass substrate on the coating film side to a predetermined depth. The thickness of the modified layer was approximately 20 nm.

The sectional surface of the coating film-attached glass after the film formation step in Example 1 was subjected to EDX analysis to check a Si distribution image, an O distribution image, a C distribution image, a F distribution image, a Na distribution image, and a K distribution, and as a result thereof, it was possible to check at least Na and K in the modified layer.

What is claimed is:

1. Coating film-attached glass, comprising: a glass substrate; and a coating film provided on at least a part of a surface of the glass substrate,
    wherein a region from the surface of the glass substrate on the coating film side to a predetermined depth is a modified layer,
    a content of B$_2$O$_3$ in the modified layer is less than that in a region deeper than the modified layer, by mass % in terms of an oxide, and a content of Na$_2$O in the modified layer is less than that in the region deeper than the modified layer, by mass % in terms of an oxide,
    the modified layer contains at least 1 to 8 mass % of B$_2$O$_3$, 1 to 6 mass % of Na$_2$O, and 80 mass % or more of SiO$_2$, in terms of an oxide, and
    the region deeper than the modified layer contains at least 9 to 15 mass % of B$_2$O$_3$, 3 to 9 mass % of Na$_2$O, and 70 mass % or more of SiO$_2$, in terms of an oxide.

2. The coating film-attached glass according to claim 1, wherein the modified layer contains carbon.

3. The coating film-attached glass according to claim 1, wherein the coating film is a silicon-free diamond-like carbon film, a silicon-containing diamond-like carbon film, a silicon oxide-based film, or an amorphous fluorine resin film.

4. The coating film-attached glass according to claim 1, wherein a film thickness of the coating film is 1 to 70 nm.

5. The coating film-attached glass according to claim 1, wherein the glass substrate is borosilicic acid glass having an expansion coefficient of $3.2 \times 10^{-6}$/K or more and $3.3 \times 10^{-6}$/K or less, or borosilicic acid glass having an expansion coefficient of $4.8 \times 10^{-6}$/K or more and $5.6 \times 10^{-6}$/K or less.

6. The coating film-attached glass according to claim 1, wherein the glass substrate is a vial container, a syringe barrel, a needle-tipped syringe, an ampule, or a cartridge type syringe.

7. A production method for the coating film-attached glass of claim 1, the method comprising:
    a modification step of setting a region from the surface of the glass substrate on a side on which the coating film is provided to a predetermined depth as a modified layer; and
    a film formation step of forming the coating film on the surface of the glass substrate on which the modified layer is formed,
    wherein the modification step includes at least any one step of (i) a step of blasting a flame generated by burning low hydrocarbon gas in the presence of oxygen gas from a burner to apply a portion rich in plasma in the flame to be blasted from the burner to the surface of the glass substrate on the side on which the coating film is provided, (ii) a step of performing a laser treatment with respect to the surface of the glass substrate on the side on which the coating film is provided, and (iii) a step of performing a high-temperature gas treatment with respect to the surface of the glass substrate on the side on which the coating film is provided.

8. The production method for coating film-attached glass according to claim 7, wherein the film formation step is a step of turning raw material gas containing at least hydrocarbon-based gas into plasma to form an amorphous coating film containing at least carbon as the coating film on the surface of the glass substrate on the side on which the coating film is provided.

9. The production method for coating film-attached glass according to claim 7, wherein in the modification step, a temperature of a surface of the glass substrate on a side opposite to the surface on the side on which the coating film is provided is measured by a non-contact type thermometer, and the temperature to be measured is in a specific temperature range.

10. A modified glass substrate, comprising: a modified layer on at least a part of a surface of a glass substrate,
   wherein the modified layer is a region from the surface of the glass substrate to a predetermined depth and
   a content of $B_2O_3$ in the modified layer is less than that in a region deeper than the modified layer, by mass % n terms of an oxide, and a content of $Na_2O$ in the modifier is less than at the region deeper than the modified layer, by mass % in terms of an oxide,
   the modified layer contains at least 1 to 8 mass % of $B_2O_3$, 1 to 6 mass % of $Na_2O$, and 80 mass % or more of $SiO_2$, in terms of an oxide, and
   the region deeper than the modified layer contains at least 9 to 15 mass % of $B_2O_3$, 3 to 9 mass % of $Na_2O$, and 70 mass % or more of $SiO_2$, in terms of an oxide.

11. The coating film-attached glass according to claim 1, wherein the modified layer has a microcrystalline structure at least in part.

12. The coating film-attached glass according to claim 11, wherein the microcrystalline structure contains carbon.

\* \* \* \* \*